United States Patent [19]

Zopfy et al.

[11] 4,332,355

[45] Jun. 1, 1982

[54] METHOD AND APPARATUS FOR AUTOMATICALLY LOADING TAPE CARTRIDGES WITH SUPPLY TAPE

[75] Inventors: Rainer K. Zopfy, Ronkonkoma; Robert F. Nolan, Manorville; Carl J. Stapf, Shirley, all of N.Y.

[73] Assignee: Raikon Research Corporation, Ronkonkoma, N.Y.

[21] Appl. No.: 163,318

[22] Filed: Jun. 26, 1980

[51] Int. Cl.³ ................... B65H 19/20; B65H 19/16
[52] U.S. Cl. ................... 242/56 R; 242/58.4
[58] Field of Search ............. 242/56 R, 67.1 R, 67.2, 242/67.3, 58.1, 58.2, 58.3, 58.4; 156/502, 504

[56] References Cited

U.S. PATENT DOCUMENTS

| | | | |
|---|---|---|---|
| 3,637,153 | 1/1972 | King | 242/56 |
| 3,737,358 | 6/1973 | King | 242/56 R |
| 3,753,834 | 8/1973 | King | 242/56 R |
| 3,814,343 | 6/1974 | Bennett | 242/56 R |
| 3,940,080 | 2/1976 | Bennett | 242/58.4 |
| 3,997,123 | 12/1976 | King | 242/58.4 |
| 4,061,286 | 12/1977 | King | 242/58.4 |
| 4,078,698 | 3/1978 | Bosco | 221/171 |
| 4,136,838 | 1/1979 | Bosco | 242/58.4 |

*Primary Examiner*—Edward J. McCarthy
*Attorney, Agent, or Firm*—Curtis, Morris & Safford

[57] ABSTRACT

A method and apparatus are disclosed for automatically loading tape cartridges with supply tape. By this invention one tape cartridge can be wound with supply tape while simultaneously a second tape cartridge is prepared for loading with supply tape. The invention also relates to a novel shift block assembly for supporting, aligning, cutting and splicing two separate lengths of tape simultaneously. In another aspect of the invention a novel feeding assembly for controllably feeding tape cartridges to the winding position of the apparatus is disclosed.

25 Claims, 17 Drawing Figures

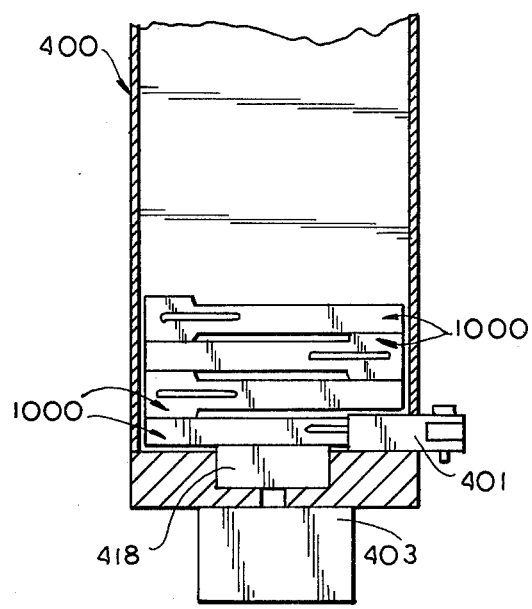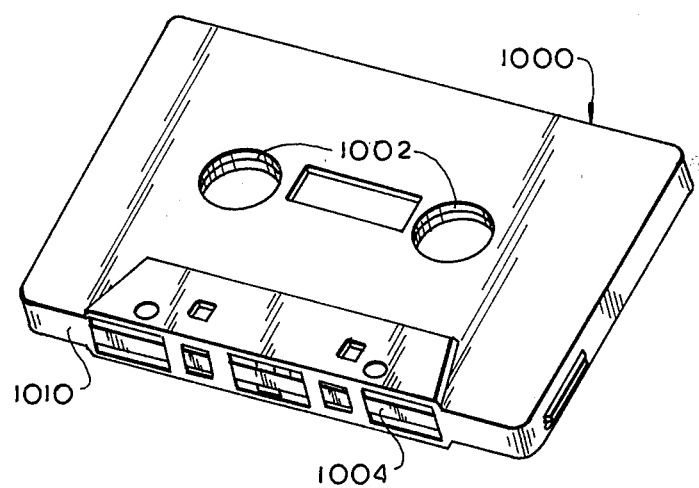
FIG. 1

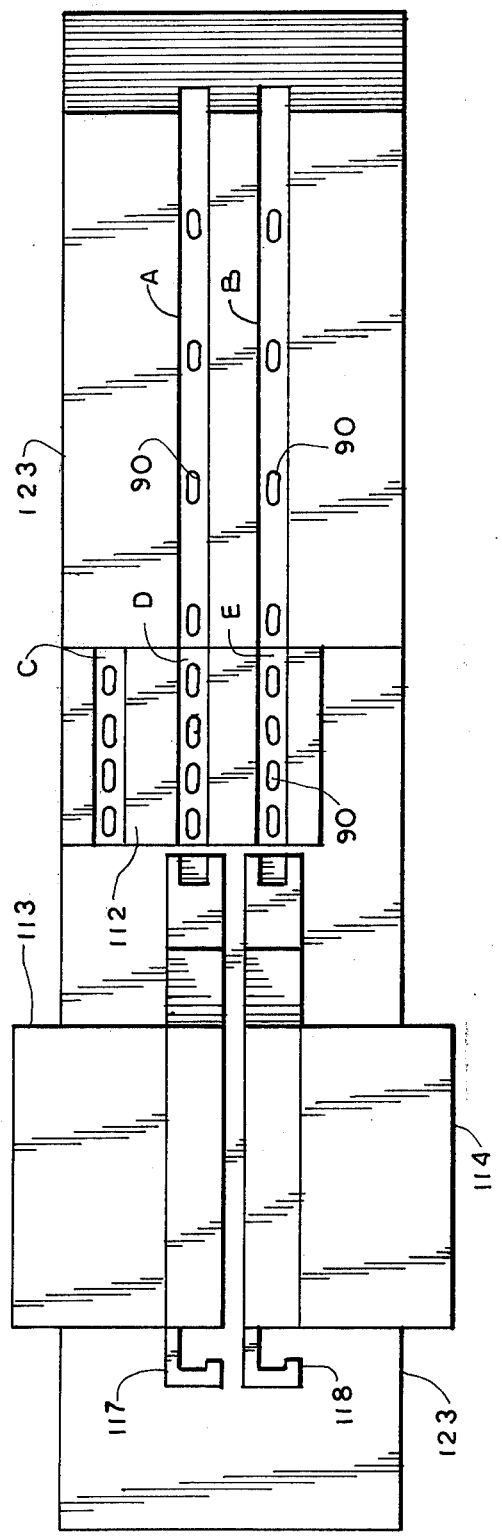
FIG. IIA

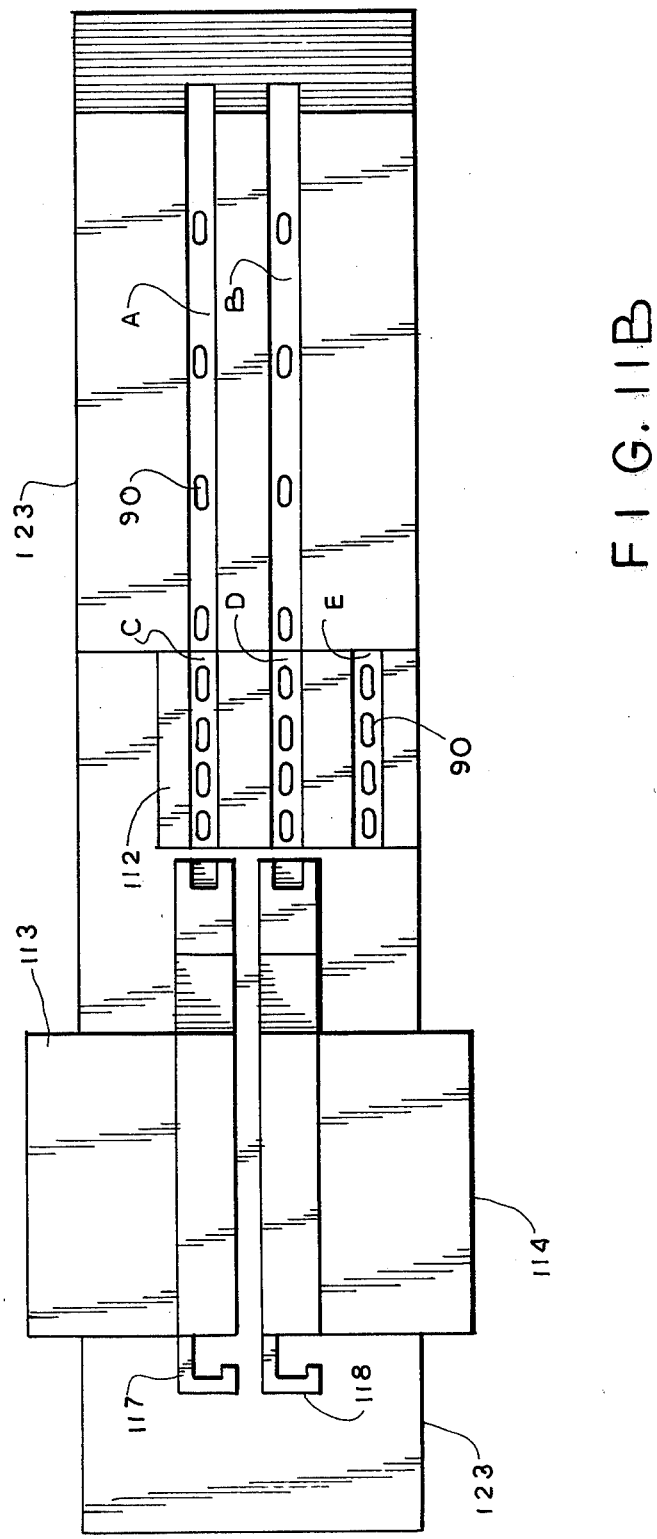

METHOD AND APPARATUS FOR AUTOMATICALLY LOADING TAPE CARTRIDGES WITH SUPPLY TAPE

This invention relates to a method and apparatus for automatically loading supply tape into tape cartridges. In accordance with one advantageous aspect of this invention, the total cycle time for loading a cartridge with such supply tape is substantially reduced in such a way that supply tape is almost continuously being loaded into a tape cartridge.

BACKGROUND OF THE INVENTION

Methods, and apparatus, for winding or loading a predetermined length of supply tape into a tape cassette are known. In accordance with such known methods, an empty cassette, which typically contains two internal hubs to which are attached a connecting tape member, commonly referred to as a "leader" tape, a predetermined length of supply tape is joined to the ends of the leader tape. This is achieved by first extracting a portion of the leader tape of the empty cassette, and then positioning the extracted leader across a suitable assembly for controllably cutting and separating the cut ends of the extracted leader. One end of the cut leader tape is joined to the leading end of a supply tape, and then a desired length of supply tape is wound into the cassette. Once the winding operation, or cycle, has been completed, the supply tape is joined to the other cut end of the previously extracted leader to complete the loading operation.

In winding machines which are capable of performing these operations, mechanisms are provided for feeding a cassette from a suitable supply to a winding or filling position, releasably holding the cassette in position for the winding operation, extracting a portion of the leader and positioning the extracted portion with a cutting and splicing assembly to effectuate the joining of the supply tape with the leader. Each discrete operation requires a finite amount of time, and the total cycle time for loading a cassette is equal to the sum of the times expended for each particular step. The period of time when supply tape is not actually being wound into a cassette, such as the time required for extracting the leader or cutting and splicing the supply tape and leader tape, is referred to as "down" time.

Certain machines are known which load one cassette at a time and, therefore, perform each discrete step sequentially. This results in a relatively long cycle time and, consequently a long down time. Other machines are known which reduce the down time and, therefore, the overall cycle time, by providing means for extracting the leader tape from one cassette held in a preparation assembly while a second cassette is being wound in a separate filling assembly. Although such machines reduce the total cycle time by an amount approximately equal to the time required to extract the leader, they still exhibit relatively slow cycle times since the extraction time constitutes only one portion of the overall cycle time. These machines still have an undesirably long down time during which no supply tape is actually being wound into a cassette.

A need therefore exists for an automatic winding machine with the capability of substantially minimizing down time so as to decrease the total time required to load a tape cartridge.

OBJECTS OF THE INVENTION

It is, accordingly, an object of the present invention to provide a method and apparatus for minimizing the total cycle time required to load a tape cartridge with supply tape.

It is another object of the invention to provide a method and apparatus for winding supply tape into one cartridge while preparing a second cartridge to be wound with supply tape.

It is a further object of the invention to provide an apparatus with two separate winding assemblies adapted to receive and hold respective cartridges for winding with supply tape.

It is still a further object of the invention to provide an apparatus having an assembly designed to support, align, cut and splice two separate tapes positioned therein simultaneously.

It is still another object of the invention to provide a feeding assembly for controllably feeding cartridges into the winding position of a tape loading machine, regardless of the particular orientation of the cartridges fed into the feeding assembly.

An additional object of the invention is to provide an improved method and apparatus which overcomes the aforenoted disadvantages and drawbacks of the prior art.

Other objects and embodiments of the invention will be apparent from the description which follows.

SUMMARY OF THE INVENTION

It should be understood that although the description of the present invention set forth herein specifically relates to loading a tape cassette by joining a supply tape to the cut ends of a leader, the invention is not so limited. The apparatus and method herein disclosed and claimed can be modified within the spirit of the invention to include winding supply tape into various types of tape cartridges and to further include joining supply tape to a pre-recorded or unrecorded tape member connected to the hubs of a tape cartridge. Accordingly, the term "cassette" can be used interchangeably with the term "cartridge" and similarly the terms "leader" and "tape member" can be interchangeably used.

The objects and advantages of the present invention may be achieved, in general, through the use of a winding apparatus having two winding assemblies so as to enable the apparatus to selectively wind supply tape into one or the other of the cartridges positioned in either winding assembly. A preferred arrangement of the winding assemblies is one in which they are in a side by side relationship. For purposes of the following description it is assumed that the winding assemblies are in juxtaposition with one designated as the inside winding assembly and the other designated as the outside winding assembly.

In accordance with another feature of the present invention, a shift block assembly supports, aligns, cuts and splices two separate lengths of tape which are positioned therein simultaneously. This assembly is comprised of a support member and a movable block which move relative to one another. The support member is provided with first and second tape guideways, or tracks, for supporting and guiding either a length of the supply tape or a tape member extracted from a tape cartridge. The movable block is provided with a plurality of tracks and cooperates with the support member such that different tracks on the support member and the movable block can be selectively aligned.

For purposes of this general description it is assumed that supply tape is first wound into a first cassette positioned in the outside winding assembly. While the supply tape is being wound into the first cassette along one tape track of the shift block assembly, a portion of the leader in the second cassette positioned in the inside winding assembly is extracted and positioned in a second tape track of the shift block assembly. At the same time, a predetermined length of splicing tape is advanced in a splicer head assembly, which is aligned with the shift block assembly, and cooperates with the tracks of the support member. After a desired length of supply tape has been wound into the first cassette, the supply tape in one tape track and the extracted leader positioned in the second tape track are simultaneously cut. The splicing tape held in the splicer head assembly can also be cut at this time, for example, by utilizing a double acting cutter assembly. The movable block then is shifted to align both the trailing end of the supply tape already wound into the first cassette with the leader previously extracted therefrom; and also the leader extracted from the second cassette is aligned by this movable block with the leading end of the supply tape. The so-aligned tapes are then simultaneously spliced. After the splicing operation is completed, the supply tape is wound into the second cassette while the first cassette is replaced by a third cassette in the outside winding assembly. This third cassette is then wound with supply tape in similar manner as described above.

It should be apparent from the foregoing description that, by the method and apparatus of the present invention, supply tape is wound almost continuously into one or the other of the cassettes positioned in the winding assemblies, thereby substantially reducing the total cycle time of the machine.

BRIEF DESCRIPTION OF THE DRAWINGS

The objects and advantages of the present invention may best be understood and appreciated by reference to the accompanying drawings which illustrate the apparatus incorporating a preferred embodiment of the invention and capable of being used to carry out the method of the invention.

FIG. 1 depicts a standard empty cassette with a leader attached.

FIGS. 11A and 11B are top views of the shift block assembly showing the movable block in the inside or retracted position and in the outside or extended position, respectively.

DETAILED DESCRIPTION OF A PREFERRED EMBODIMENT

The following description is presented as a non-limiting example of the method and apparatus of the instant invention for winding supply tape into one cassette while simultaneously preparing a second cassette for being wound with supply tape so as to minimize the total cycle time of the machine. In an effort to provide a clear and concise description of the instant invention, one entire operating cycle is described with reference to the FIGURES. To aid in describing the operation of the machine, a cassette designated as B1 is first fed to the outside winding assembly and is therefore the first one wound with supply tape. A second cassette designated as A1 is fed to the inside winding assembly. It is understood that the apparatus of the invention can operate with equal effectiveness if the first cassette is inserted into the inside winding assembly.

The standard cassette 1000 shown in FIG. 1 has two hubs 1002 which can be rotated in either direction. Opposite ends of a leader tape 1004 are connected to respective hubs 1002. In a typical loading cycle of the cassette, a portion of leader 1004 is extracted from the cassette housing and cut. Then one of the cut ends is spliced to a supply tape. After the desired amount of supply tape has been wound into the cassette, the supply tape is cut and spliced to the other end of the extracted leader to complete the loading operation.

Figure 2:
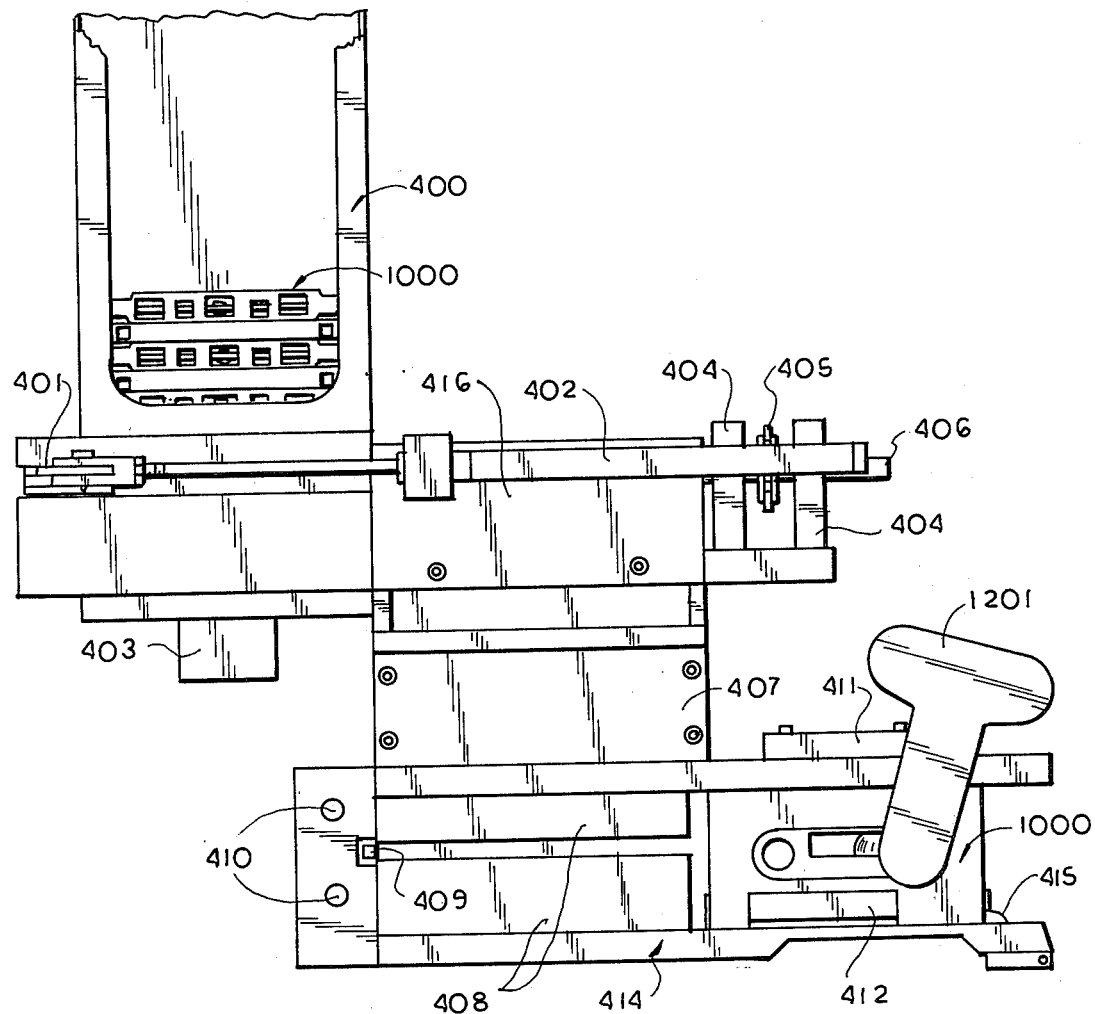
FIG. 2 is a frontal view of the feeding, positioning and winding assemblies showing a cassette positioned in the outside winding assembly.
Figure 3:
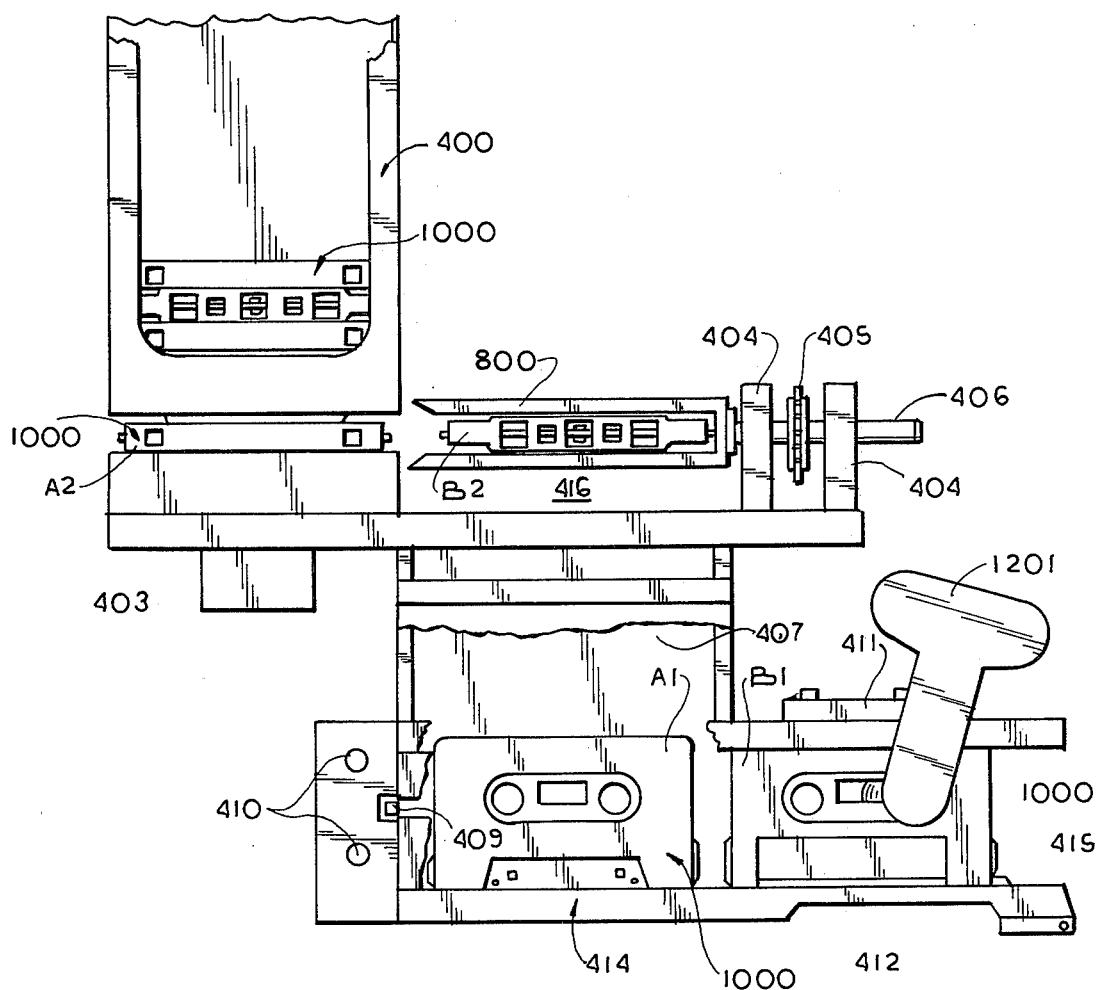
FIG. 3 is similar to FIG. 2 but additionally shows a cassette positioned in the feeding and positioning assembly.
Figure 4:
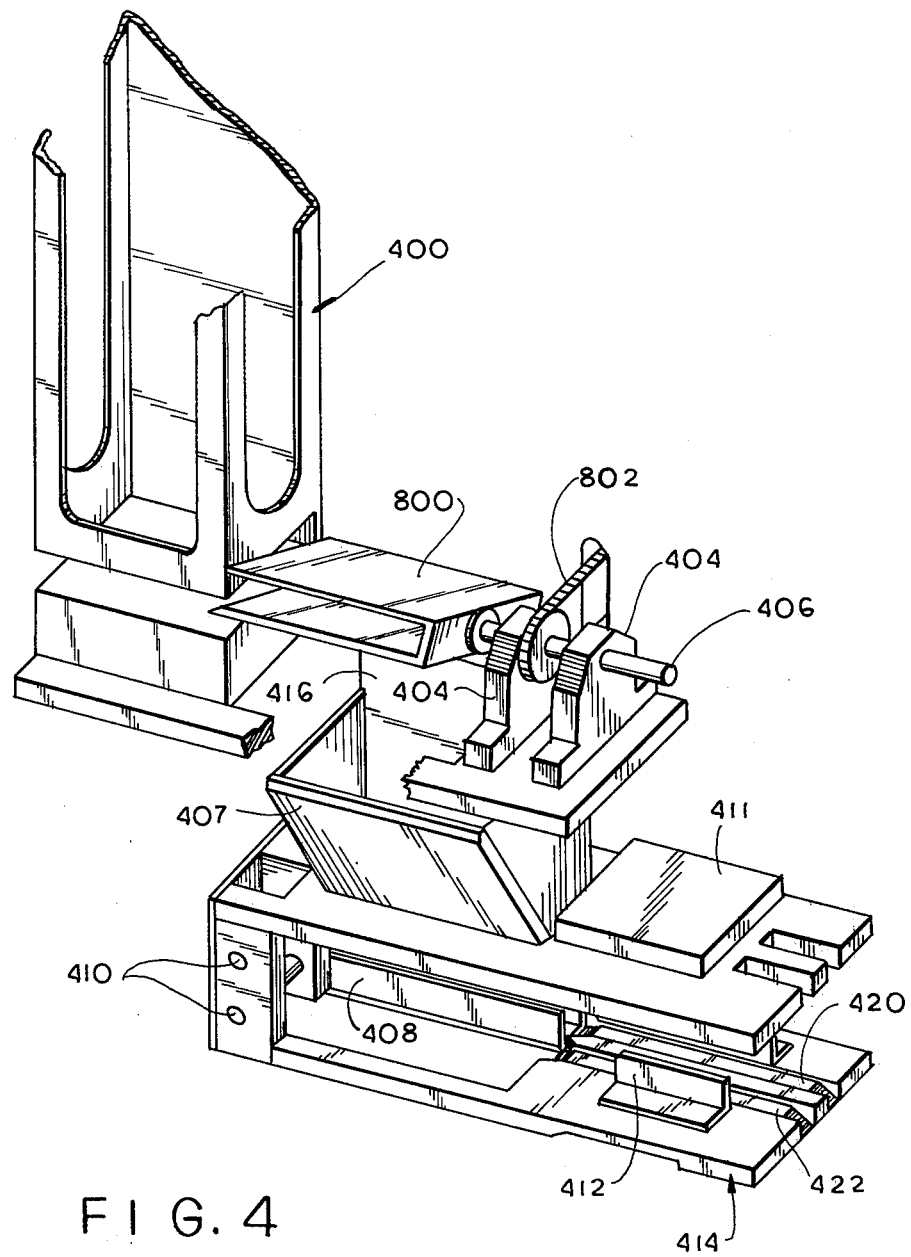
FIG. 4 is a perspective view of the feeding and positioning assembly.
Figure 5A:
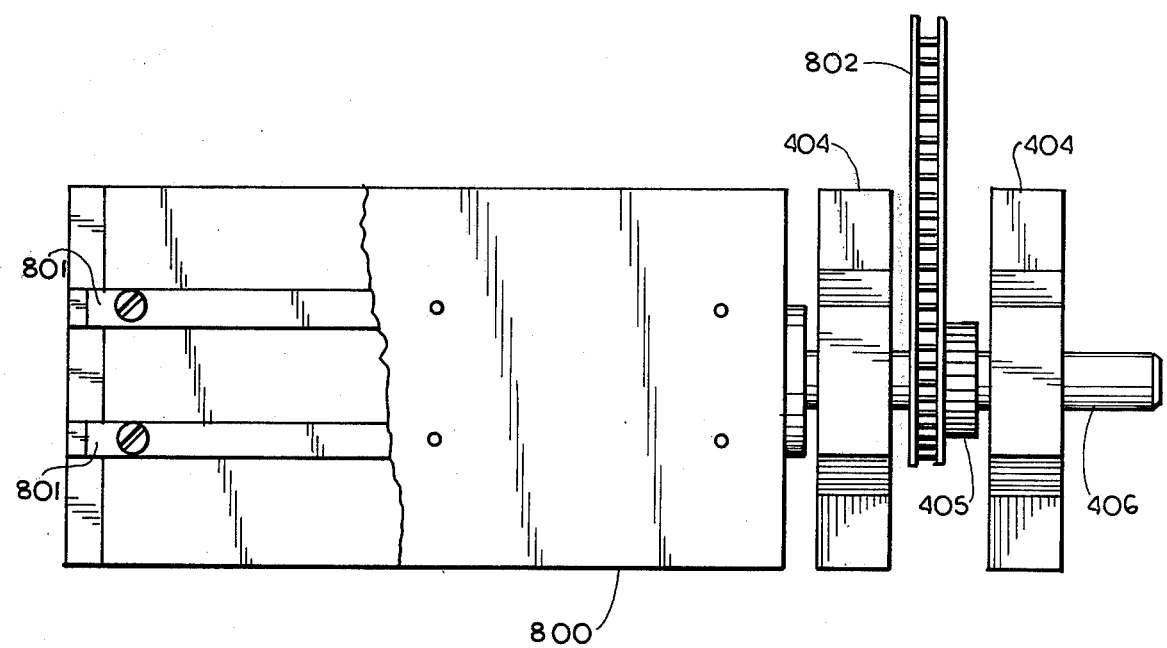
FIGS. 5A and 5B illustrate the rotatable cartridge jacket of the feeding assembly, with its associated drive means.
Figure 5B:
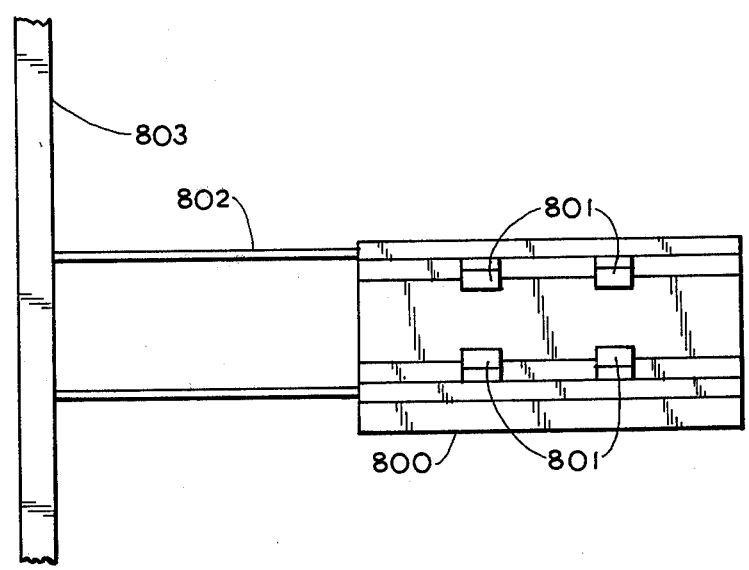

FIGS. 2 to 5 illustrate an embodiment of the feeding assembly for the winding machine of the present invention. A plurality of cassettes 1000 are randomly stacked in vertical hopper 400, as shown in FIGS. 2 and 3. The cassette at the bottom of hopper 400, hereafter referred to as cassette B1, is ejected therefrom and fed to rotatable cartridge jacket 800, shown in FIG. 3, by a pushing member 401 activated and controlled by air cylinder 402 shown in FIG. 2. Cassette B1 is inserted into jacket 800 and rotated until the desired orientation of the cassette is obtained whereafter this cassette falls from jacket 800 into funnel 407. As shown in FIGS. 5A and 5B, jacket 800 has four cassette guide members 801 to aid in supporting and aligning cassette B1 therein. Guide members 801 are arranged to cooperate with the outer housing of the cassette so that the front edge 1010 of the cassette (i.e. the edge provided with apertures for exposing the tape therein) always enters positioning assembly 408 with the desired orientation. Shaft 406, connected to jacket 800, is rotated by drive chain 802 which is connected to a suitable drive means located behind faceplate 803.

A preferred system for activating certain of the equipment described herein involves the use of suitable fluid actuating mechanisms such as pneumatic devices which can be electrically controlled. Furthermore, it should be understood that the overall sequential control logic of the machine can be effected by electrical control logic circuits known to those skilled in the art.

After cassette B1 has been inserted into jacket 800, a push rod 403, driven by the air cylinder shown in FIGS. 2 and 3, raises the stack of cassettes in hopper 400 to allow pushing member 401 to return to its initial position.

It is not necessary to align the cassettes stacked in hopper 400, since jacket 800 is designed to rotate and to releasably hold a cassette so that the cassette always is released therefrom in the same position or alignment, that is, front edge first. Depending upon the orientation of the cassette fed into jacket 800, the cassette will fall into funnel 407 at either the 90° or 270° position of rotating jacket 800. After a cassette is released from the rotating jacket, at either the 90° or 270° position, the jacket continues to rotate to return to its original position in alignment with the next cassette in hopper 400. More particularly, the guide members 801 utilized to support and align a cassette injected into rotating jacket 800 can be either pins or rods protruding from the inner surface of the jacket or of some other suitable protruding design. The transverse spacing between guide members 801 is greater than the cross section of the back edge of the cassette but less than the cross section of the thicker front edge of the cassette. Therefore, the cassette is only released from the jacket when it is rotated to a substantially vertical position in which the front edge is clear of the guide members and free to fall into funnel 407. Depending upon the orientation of the cassette as injected into the rotating jacket and the direction of rotation of the jacket, the cassette will either rotate 90° or 270° before it is released.

Figure 6:
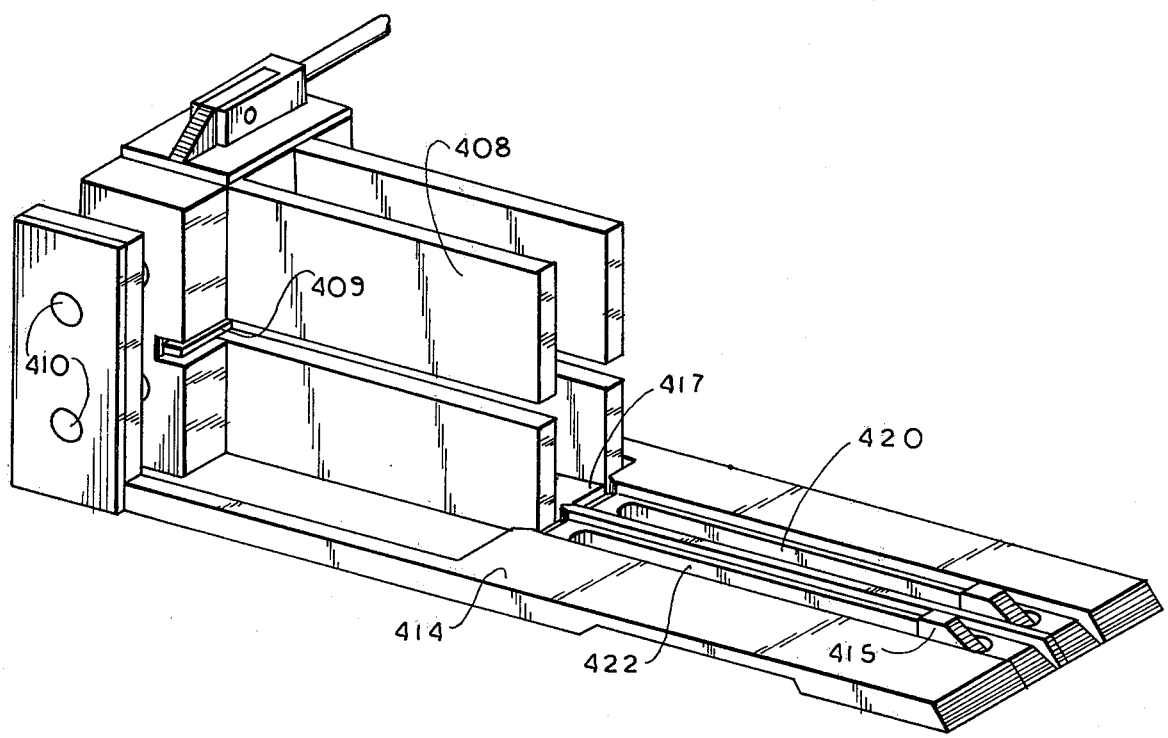
FIG. 6 is a perspective view of the positioning assembly and the lower portion of the inside and outside winding assemblies.

Cassette B1 is guided by cassette guide plate 416 through funnel 407 to positioning assembly 408 shown in FIGS. 2 and 3. The positioning assembly is adapted to receive a cassette from the funnel and to support that cassette in a vertical position on bottom plate 417 as shown in FIG. 6. In the example described herein, positioning assembly 408 is movable, and receives a cassette while in alignment with the outside winding assembly. A cassette pushing member 409 is activated to move cassette B1 from the positioning assembly 408 either to an inside winding assembly 420 or to outside winding assembly 422. As shown in FIG. 6, positioning assembly 408 is driven along guide rods 410 to be selectively aligned either with the inside or outside winding assembly. The positioning assembly is suitably driven for movement between the winding assemblies.

Positioning assembly 408 includes a guide assembly 414, as shown in FIGS. 2 and 3, comprised of a top pressure plate 411 and side pressure plates 412 to support cassette B1. The cassette is ejected from the guide assembly by pushing member 409 into either the inside winding assembly 420 or outside winding assembly 422. The ejected cassette is stopped by cassette stop 415 which insures that the cassette is properly positioned in the winding assembly. As cassette B1 is ejected into outside winding assembly 422 a cassette A1 is inserted into jacket 800.

Figure 9:
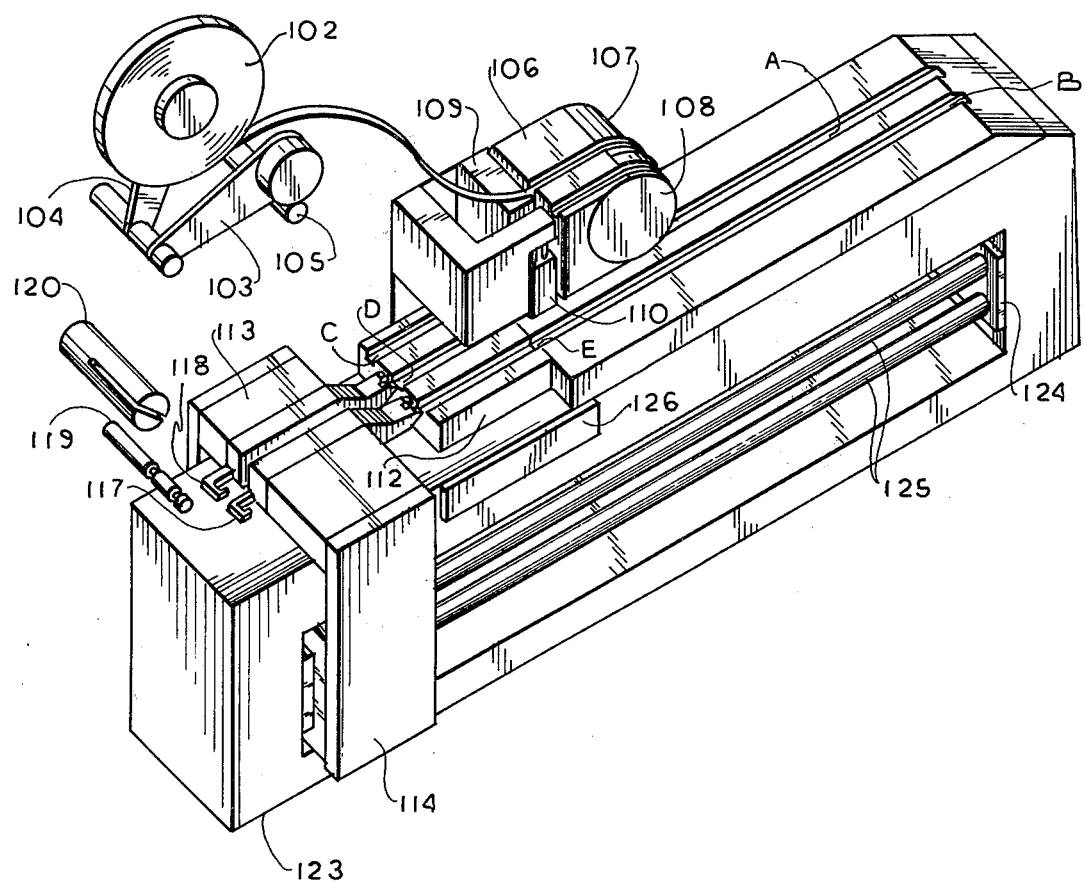
FIG. 9 is a perspective view of the shift block assembly, showing the splicing head assembly and leader extractors.

An extractor 114, shown in FIG. 9, is slidably mounted on guide rods 125 and is driven by a motor toward winding assembly 422 until it impinges extractor stop 124. As extractor 114 moves toward winding assembly 422, cassette B1 is ejected into this winding assembly, and the stack of cassettes in hopper 400 is raised as described above, and positioning assembly 408 returns to its initial position to receive cassette A1.

Figure 7A:
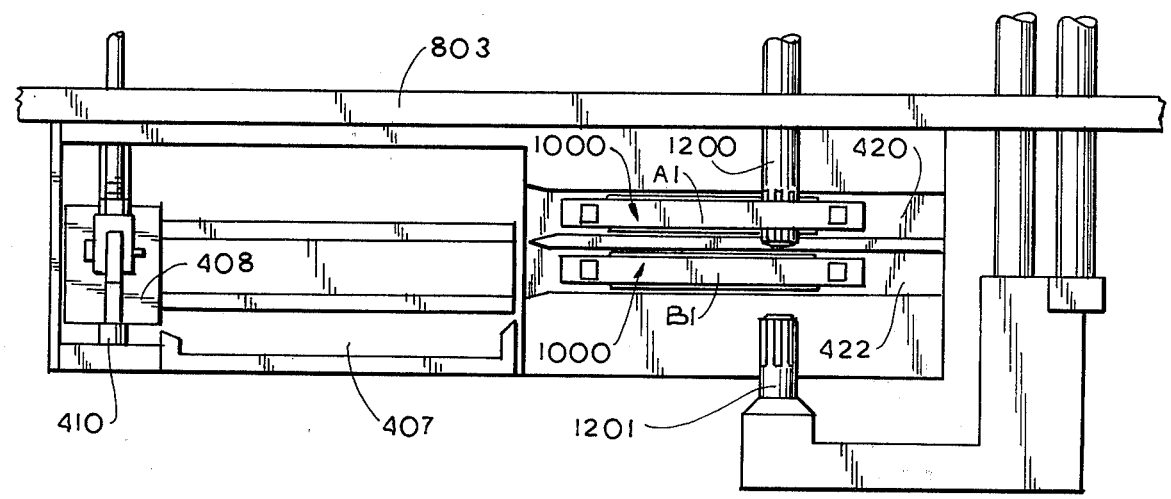
FIGS. 7A and 7B are top views of the winding assemblies showing a turbine cylinder engaged with the hub of a cassette in each of the inside and outside winding assemblies, respectively.
Figure 7B:
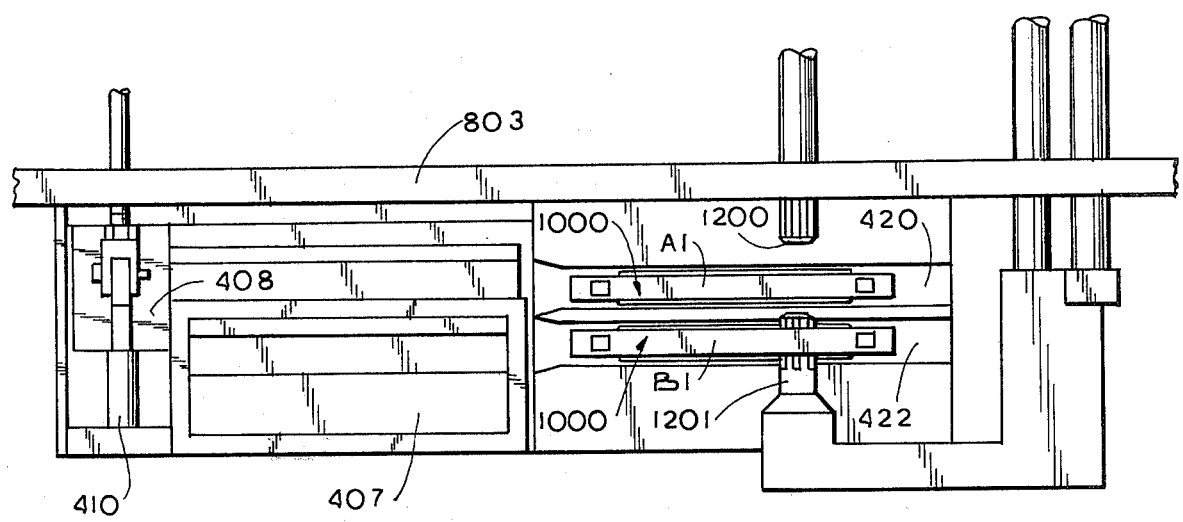

A vacuum, created by a suitable vacuum device known to one skilled in the art, is applied to leader 1501 in cassette B1 to extract a portion of the leader therefrom. Subsequently, turbine cylinder 1201 extends into winding assembly 422 to engage the hub of cassette B1, as shown in FIG. 7B.

Figure 8:
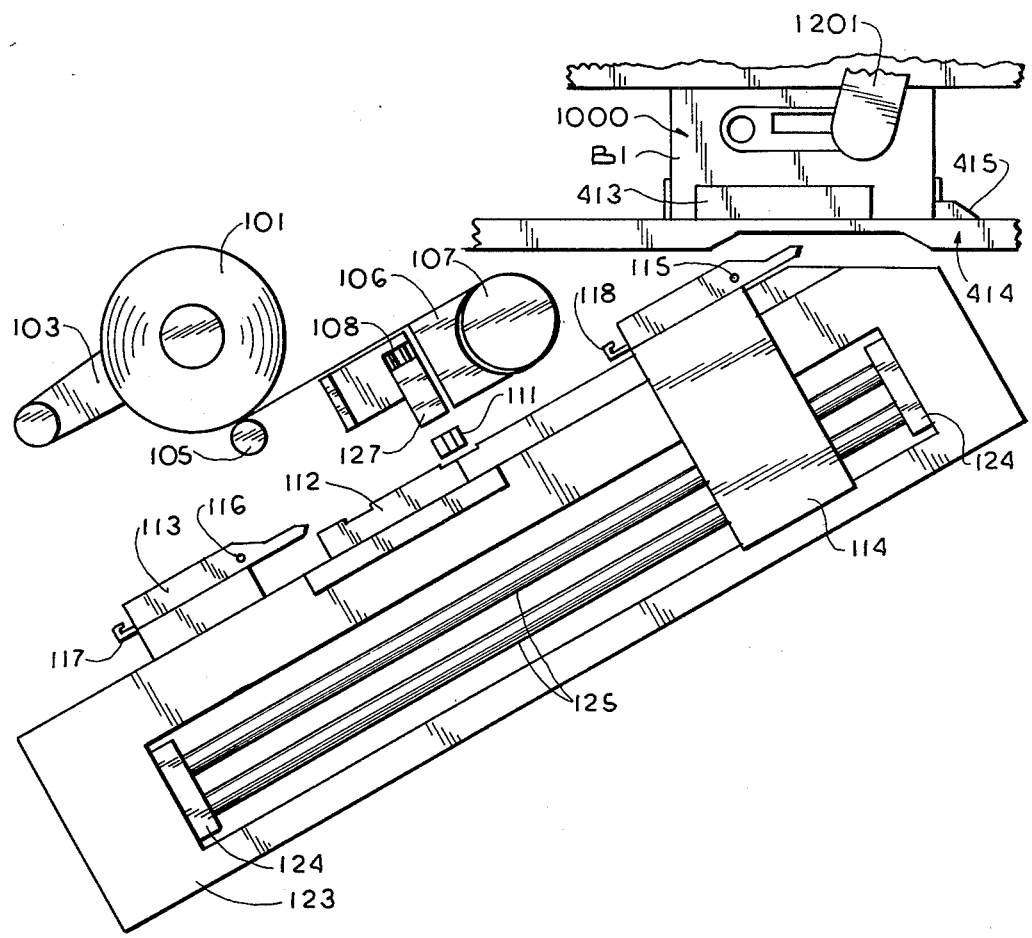
FIG. 8 is a frontal view of the winding and shift block assemblies.

After a portion of the leader is extracted from cassette B1 by this vacuum, a leader pin 115, shown in FIG. 8, extends to and engages this leader. The vacuum applied to the leader by the vacuum device then is deactivated, and turbine cylinder 1201 is rotated by a motor attached thereto to wind the leader to the right, as viewed in FIG. 7B. After the leader has been wound so as to create tension on leader pin 115, the turbine cylinder is retracted and extractor 114 is driven away from winding assembly 422 toward a shift block assembly shown in detail in FIGS. 11A and 11B.

This shift block assembly comprises a support member 123 fixedly mounted to the faceplate 803 of the apparatus, and a movable block 112 adapted to move outwardly from the faceplate. The fixed support member 123 of the shift block assembly is provided with two tape tracks or guideways A and B; and movable block 112 is provided with three tape tracks C, D and E. FIG. 11A shows movable block 112 in the retracted or inside position in which tracks A and B of the support member are aligned with tracks D and E, respectively of the movable block. FIG. 11B shows movable block 112 in the extended or outside position wherein tracks A and B of the support member are aligned with tracks C and D, respectively, of the movable block. Movable block 112 is driven laterally by an air cylinder to selectively align its tracks with those of the fixed support member.

Extractor 114 operates to position leader 1501, extracted from cassette B1, in tracks B and E when movable block 112 is disposed in the retracted position, as shown in FIG. 11A. A vacuum then is applied through the apertures 90 disposed in tracks B and E to hold this leader firmly in place. After extractor 114 with leader extractor pin 115 attached thereto has disposed the extracted leader across the shift block assembly, a leader separator 122, shown in FIG. 10, engages leader 1501 after which leader extractor pin 115 is retracted to release the leader. Leader separator 122 is used to move and hold the extracted leader now positioned on the shift block assembly away from tracks B and E. The downward motion of extractor 114 is damped during the engagement of leader separator 122 with leader 1501, and also during the retraction of leader pin 115 from leader 1501 to prevent the leader from jamming in the leader extractor. This also permits the smooth release of the leader from the extractor.

Figure 10:
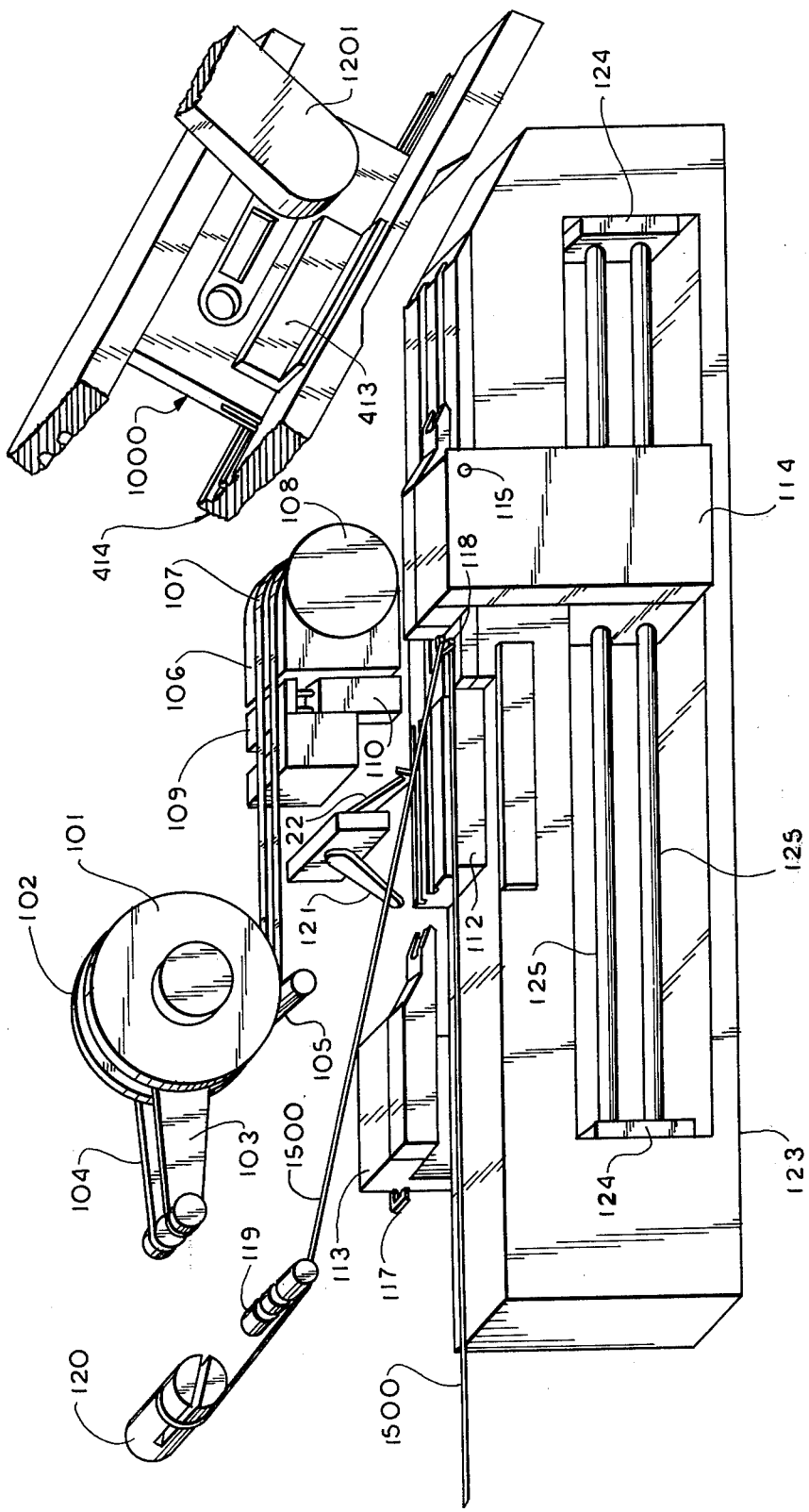
FIG. 10 is a frontal view of the leader pullout assembly.

After leader 1501 is extracted from cassette B1, positioning assembly 408 into which cassette A1 has been injected from jacket 800 and funnel 407, is shifted to align cassette A1 with inside winding assembly 420. Turbine cylinder 1201 is then advanced into engagement with the hub of cassette B1 and cutter assembly 111, shown in FIGS. 8 and 10, is activated to cut leader 1501. After the leader has been cut movable block 112 is then driven from the inside position to the outside position; and supply tape 1500 which normally is positioned in track D, is brought into alignment with leader 1501 on track B. Leader separator 122 maintains suitable tension on leader 1501 so as to prevent formation of a loop in the extracted leader and thus avoid undesired interference of this leader with any splicing or cutting operation or with winding of supply tape.

A splicer head assembly 109, shown in FIG. 10, is aligned with supply tape 1500 on track D and in the example described herein, with leader 1501 on track B. A splicing tape 101 is advanced by a rotatable wheel 108, cut to a predetermined length, and brought into contact with supply tape 1500 and leader 1501 by a plunger 110 to effect a splice. Attached to plunger 110, and aligned with track A of the support member is splicing pad 127, supplied with a vacuum to hold splicing tape thereon.

Turbine cylinder 1201 then is driven briefly to wind leader 1501 onto the supply reel of cassette B1 to take up any slack, and thereafter splicer head assembly 109 returns to its initial position, upper position. The vacuum applied to splicer pad 127 and to tracks B and D of support member 123 is deactivated, and a small jet of air is supplied to the splicing pad to allow the splicing tape to advance. Turbine cylinder 1201 then rotates the hub of cassette B1 once again, now to wind supply tape 1500 into the cassette.

While supply tape 1500 is being wound into cassette B1, cassette A1 is prepared for winding. As described above cassette A1 is inserted into winding assembly 420, shown in FIG. 7A, and, simultaneously, a cassette B2 is inserted from hopper 400 into jacket 800. As an extractor, which is substantially identical to extractor 114 and is in alignment with track A on support member 123 and track D on movable block 112, advances toward winding assembly 420 once again, now to extract leader 1502 from cassette A1, positioning assembly 408 concurrently returns to the outside position to await the loading of the next cassette B2. When extractor 113 reaches its uppermost position, a vacuum created by a suitable vacuum device is applied to extract the leader 1502 from cassette A1, and turbine cylinder 1200 engages the hub of this cassette. A leader extractor pin 116 engages the leader extracted from cassette A1, and the vacuum applied to the leader then is deactivated. Leader pin 116, similar to leader pin 115, extends from extractor 113 to engage the leader extracted from cassette A1 in order that the leader can be disposed across the splicing block assembly.

While extractor 113 moves towards winding assembly 420, splicing tape 101 is advanced by wheel 108, and the jet of air which had been supplied to splicing pad 127 is now deactivated. The aforementioned vacuum is applied to splicing pad 127 once again, and splicing tape 101 is driven in reverse direction about ⅛ of an inch. Simultaneously, the stack of cassettes in hopper 400 is lifted by push rod 403, described above, while cassette B2 in jacket 800 rotates and falls into positioning assembly 408.

Turbine cylinder 1200 is driven briefly to wind leader 1502 onto the supply reel of cassette A1 to take up any slack, and then this cylinder is removed. Also, extractor 113 returns toward the shift block assembly so as to align the extracted leader with the tracks of the shift block assembly. Leader 1502 which has been positioned in tracks A and C by extractor 113, is held firmly therein by a vacuum applied to these tracks. A leader separator 122, shown in FIG. 10, engages extracted leader 1502 and extractor pin 116 now is retracted. Extractor 113 returns to its initial position; and its downward, return movement is damped, as described above with respect to extractor 114.

After a predetermined length of supply tape has been wound into cassette B1 turbine cylinder 1201 is stopped, and a vacuum is applied once again to tracks B and D. Turbine cylinder 1200 now extends into and engages the hub of cassette A1. Cutter 111 is activated to cut leader 1502 positioned on tracks A and C, and supply tape 1500 positioned on tracks B and D, and splicing tape 101 and 102, simultaneously. Movable block 112 then is shifted laterally to the inside position, wherein tracks A and B of the support member 123 are aligned with tracks D and E of the movable block, thereby aligning 1501 on track E with supply tape 1500 already wound into cassette B1, and also aligning leader 1502 on track A with the leading end of supply tape 1500 in track D.

Now that supply tape has been wound onto the hub of cassette B1, leader separator 122 retracts completely to release leader 1501. At the same time, a leader separator 121 extends into engagement with leader 1502. Splicer head assembly 109 is activated once again to splice leader 1501 to supply tape 1500, already wound into cassette B1 and, simultaneously, to splice leader 1502 and the leading end of supply tape 1500, the latter being disposed on track D. Splicing tape 102, which had been advanced by wheel 108 to splicing pad 128, is brought into contact with leader 1502 and supply tape 1500 and, simultaneously, splicing tape 101 is brought into contact with leader 1501 and supply tape 1500.

Figure 12A:
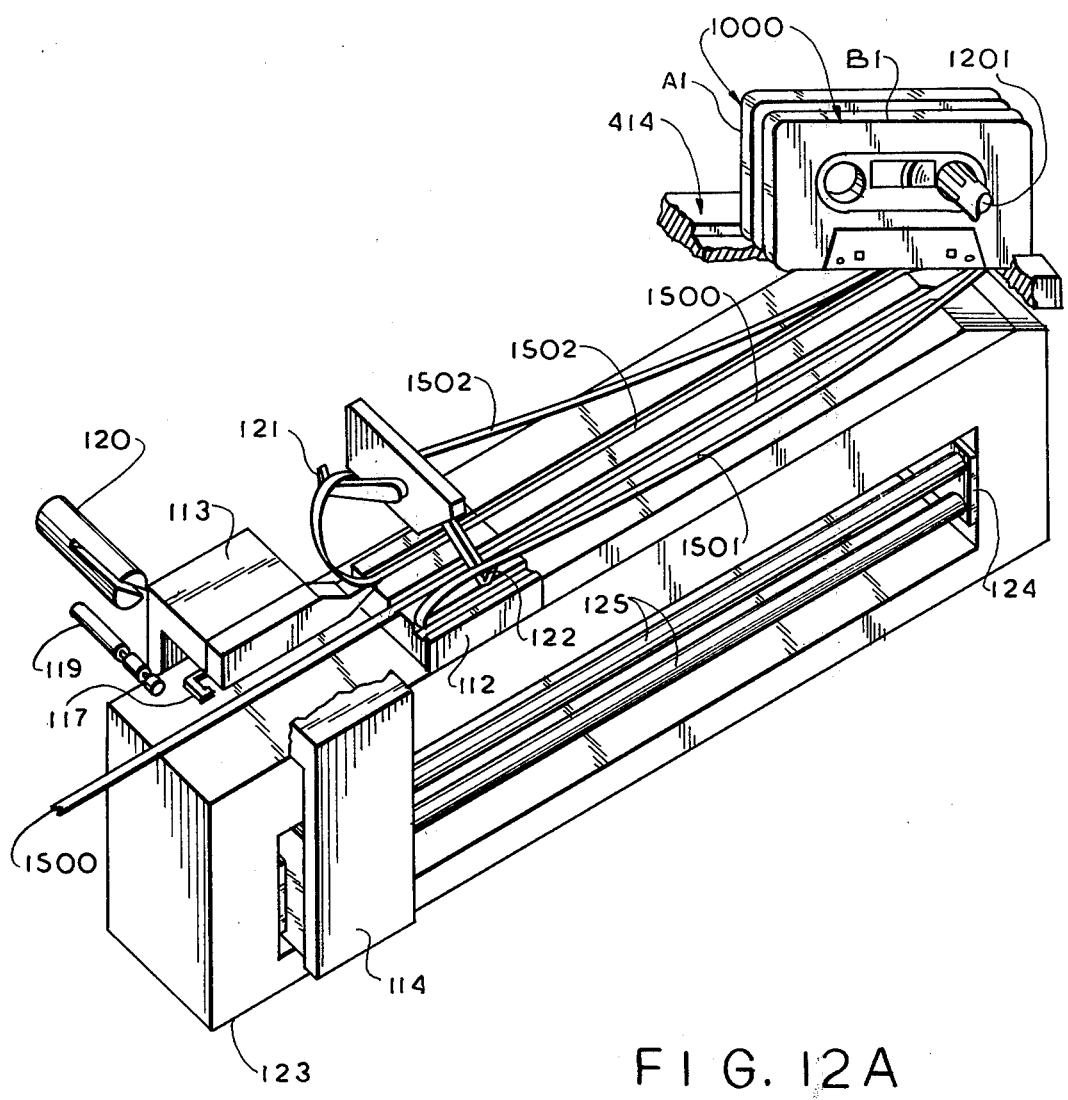
FIG. 12A is a perspective view showing the supply tape being wound into the cassette in the outside winding assembly, with the extracted leader of the cassette in the inside winding assembly positioned on the shift block assembly.
Figure 12B:
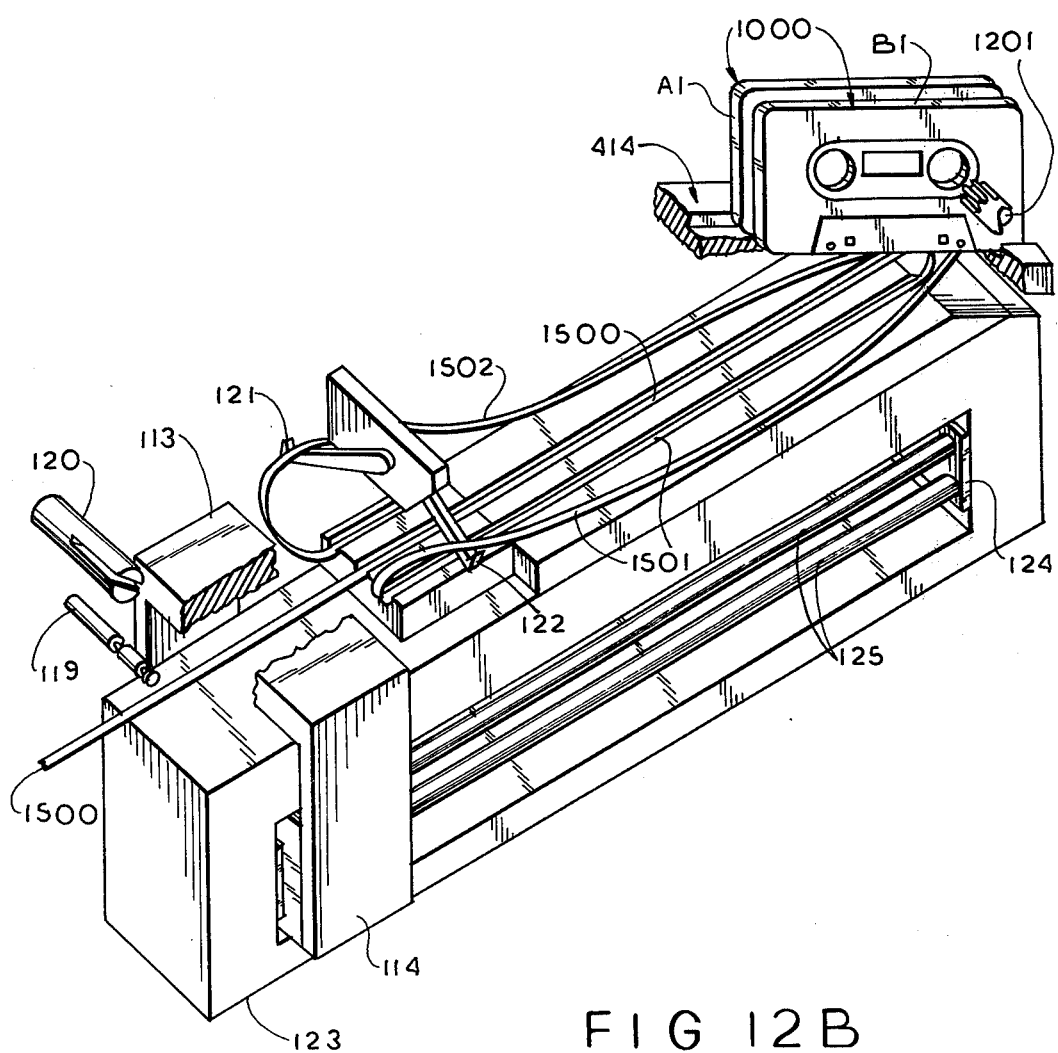
FIG. 12B is a perspective view showing the supply tape being wound into the cassette in the inside winding assembly, with the extracted leader of the cassette in the outside winding assembly positioned on the shift block assembly.

While turbine cylinder 1200 rotates the hub of cassette A1 to take up the slack of leader 1502, splicer head assembly 109 returns to its upper, quiescent position. The vacuum applied to splicing pads 127 and 128 is deactivated as is the vacuum applied to tracks A, B, D and E; and a small jet of air is supplied to both splicer pads as previously described. Turbine cylinder 1200 then is driven to rotate the hub of cassette A1 so as to wind supply tape therein, as shown in FIG. 12B. At the same time, turbine cylinder 1201 winds the remaining loop of leader 1501 into cassette B1. Also, splicing tape 101 and 102 is advanced by advance wheels 107 and 108 in splicing assembly 109, to await the next following splicing operation.

Turbine cylinder 1201 then is retracted from the hub of cassette B1. A new cassette A2 is introduced into jacket 800 and cassette B2 is ejected from positioning assembly 408 into winding assembly 422. As cassette B2 is inserted into the winding assembly, loaded cassette B1 is removed therefrom into a suitable device for collecting completed cassettes. At this point, the loading cycle for cassette B1 is complete and that for B2 proceeds in the manner described above.

Figure 13:
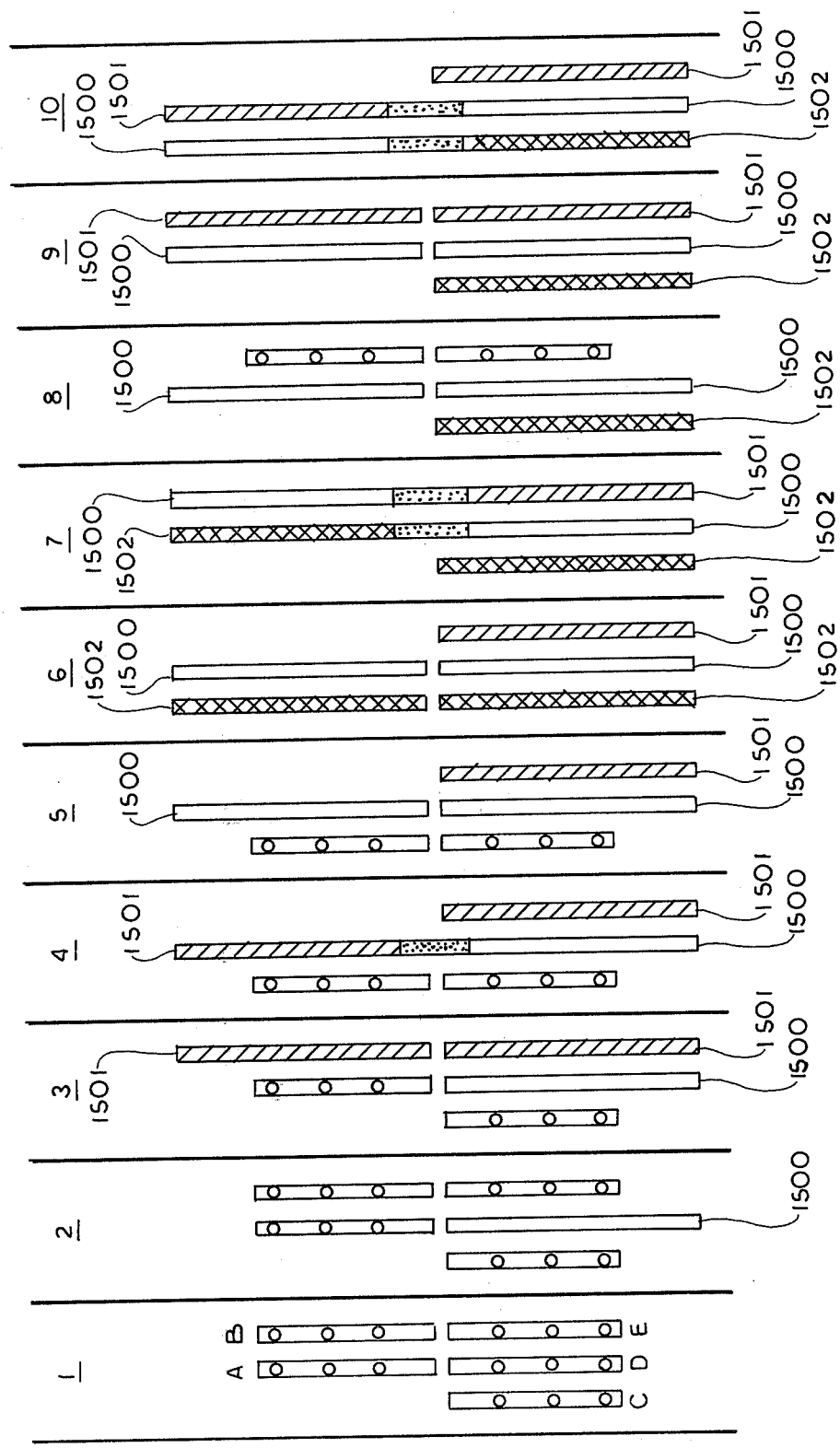
FIG. 13 is a schematic representation of the operation of the shift block assembly.

An important aspect of the present invention is the shift block assembly which is used to align, cut and splice the supply tape and leaders of the respective cassettes simultaneously. Reference is made to FIG. 13, which schematically shows the sequence of steps of the shift block assembly during a loading cycle of the machine.

Step 1 shows movable block 112 disposed in the retracted or inside position before the machine begins its operating cycle. In step 2, the leading end of supply tape 1500 is disposed on track D; while in step 3, leader 1501 of cassette B1 (positioned in the outside winding assembly) is extracted and disposed on tracks B and E. After leader 1501 is cut, movable block 112 is shifted to the outside position, shown in step 4, to align supply tape 1500 on track D with one end of leader 1501 on track B. It is recalled that, after the supply tape and leader have been properly aligned, they are spliced together.

During steps 5 and 6 supply tape is wound into cassette B1. Step 6 also shows that, while supply tape is wound into cassette B1, leader 1502 of cassette A1 (positioned in the inside winding assembly) is extracted and disposed on tracks A and C.

After a predetermined length of supply tape has been wound into cassette B1, supply tape 1500, which extends from cassette B1, and leader 1502 of cassette A1 are cut simultaneously. Movable block 112 then retracts to the inside position, as shown in step 7, so as to align tracks A and D and also to align tracks B and E. The trailing end of supply tape 1500 on track B and leader 1501 on track E, as well as the leading end of supply tape 1500 on track D and leader 1502 on track A are spliced simultaneously.

Step 8 shows supply tape being wound into cassette A1 (positioned in the inside winding assembly), which tracks B and E now are empty. At this time, loaded cassette B1 is replaced by new cassette B2. In step 9, leader 1501 of cassette B2 is disposed on tracks B and E, as in step 6, except that now the inside winding assembly is in the winding mode.

After the predetermined length of supply tape has been wound into cassette A1, supply tape 1500, which extends from cassette A1, and leader 1501 of cassette B2 are cut simultaneously. Then, movable block 112 is shifted to the outside position, as shown in step 10. The trailing end of supply tape 1500 on track A is spliced to previously extracted leader 1502 on track D; and leader 1501 on track B is spliced to the leading end of supply tape 1500 on track D. At this point, cassettes B1 and A1 both have been wound with supply tape, and the foregoing operation is repeated.

While the present invention has been particularly shown and described with reference to a preferred embodiment thereof, it should be appreciated that various changes and modifications in form and details may be made without departing from the spirit and scope of the invention. For example, the overall sequential control logic of the machine of the present invention can be effectively activated and controlled by appropriate electrical control logic circuits known to one skilled in the art. Some of these changes and modifications have been mentioned above and it is intended that the appended claims be interpreted to cover these and other such changes and modifications.

We claim:

1. Apparatus for loading supply tape into tape cartridges of the type having two internal hubs and a tape member initially connected at its ends to said hubs, said apparatus comprising:

first and second winding assemblies each adapted to receive and releasably hold a cartridge;

a cartridge positioning assembly for receiving cartridges fed thereto from a cartridge supply, said positioning assembly comprising a support seat for said cartridge, means for selectively aligning said cartridge with said first or second winding assembly and means for positioning a cartridge into said first or second winding assembly;

tape support means adapted to support and selectively align the tape member of a cartridge positioned in either of said first or second winding assemblies with said supply tape;

extractor means for extracting a portion of the respective tape members from the cartridges positioned in either of said first or second winding assemblies and positioning said extracted portion on said tape support means;

cutting means for cutting the supply tape and the respectively extracted tape members supported and aligned on said tape support means;

splicing means for joining aligned ends of said supply tape and at least one of said extracted tape members;

drive means for rotating the hub of at least one of the cartridges positioned in said first or second winding assembly to wind said supply tape thereon; and means for removing a loaded cartridge from its respective winding assembly.

2. The apparatus of claim 1 further comprising a hopper arranged to receive and hold a plurality of cartridges, ejection means for removing individual cartridges from said hopper, and a rotatable cartridge jacket adapted to receive a cartridge from said ejection means and to discharge the received cartridge to said cartridge positioning assembly in a predetermined alignment.

3. The apparatus of claim 2 further comprising a motor driven chain for rotating said jacket.

4. The apparatus of claim 1 wherein said first and second winding assemblies are in side by side relationship; and wherein said extractor means comprises respective extractors each aligned with a corresponding winding assembly.

5. The apparatus of claim 4 wherein said extractor means includes two pins for engaging and extracting portions of respective tape members of said cartridges positioned in said winding assemblies.

6. The apparatus of claim 1 wherein said extractor means comprises two slidably mounted vacuum means each adapted to move between a respective one of said first and second winding assemblies and said tape support means for aligning the tape members of respective cartridges on said tape support means.

7. The apparatus of claim 1 wherein said tape support means comprises:

a support means having first and second tracks therein each adapted to receive tape;

a movable block having third, fourth and fifth tracks, said fourth track receiving said supply tape; and means for selectively aligning the first track of said support means with the fourth track of said movable block and, concurrently, the second track of said support means with the fifth track of said movable block, and for selectively aligning the second track of said support means with the fourth track of said movable block and, concurrently, the first track of said support means with the third track of said movable block.

8. The apparatus of claim 7 wherein said cutting means includes a double-acting cutting edge for simultaneously cutting tape positioned in the first track of said support means and the fourth track of said movable block and, concurrently, tape positioned in the second track of said support means and the fifth track of said movable block as well as tape positioned in the second track of said support means and the fourth track of said movable block and, concurrently, tape positioned in the first track of said support means and the third track of said movable block.

9. The apparatus of claim 8 further comprising fluid means for activating said cutting means.

10. The apparatus of claim 1 wherein said drive means is a motor driven cylinder.

11. A method for loading supply tape into cartridges, each cartridge being of the type containing two internal hubs connected to a tape member therebetween, said method comprising the steps of:
  (a) feeding a first cartridge into a first winding assembly;
  (b) extracting a portion of the tape member of said first cartridge;
  (c) positioning and supporting the extracted tape member in a first track of a support means and in a first track of a multi-track movable block;
  (d) cutting said tape member and separating the cut ends thereof;
  (e) aligning a second track of said movable block with the first track of said support means;
  (f) positioning the supply tape in said second track of said movable block so as to align said supply tape with a cut end of said tape member positioned in said first track of said support means;
  (g) joining said supply tape and said cut end of said tape member;
  (h) winding a length of supply tape into the first cartridge and, while said supply tape is being wound,
    (i) feeding a second cartridge into a second winding assembly;
    (ii) extracting a portion of the tape member of said second cartridge; and
    (iii) positioning and supporting the extracted tape member of said second cartridge in a second track of said support means and a third track of said movable block;
  (i) when said length of supply tape has been fully wound into said first tape cartridge, simultaneously cutting the extracted tape member of said second cartridge and the supply tape positioned on said support means and said movable block;
  (j) aligning the second track of said movable block with the second track of said support means and the first track of said movable block with the first track of said support means;
  (k) simultaneously joining said supply tape in the second track of said movable block to the tape member in the second track of said support means and the supply tape in the first track of said support means to the tape member in the first track of said movable block;
  (l) winding a length of supply tape into said second cartridge and simultaneously replacing said first cartridge in said first winding assembly with a third cartridge; and repeating steps (a) through (l).

12. The method of claim 11 further comprising the steps of:
  feeding said first cartridge into a rotatable cartridge jacket;
  rotating said cartridge jacket either 90° or 270° so as to controllably position said first cartridge in a positioning assembly;
  selectively aligning said first cartridge in said positioning assembly with said first or second winding assembly; and
  feeding said first cartridge into said first or second winding assembly.

13. The method of claim 11 further comprising applying a vacuum to the tape member of said first cartridge for extracting a portion of said tape member.

14. The method of claim 11 further comprising applying a vacuum to said first and second tracks of said support means and said first, second and third tracks of said movable block for positioning and aligning said tape therein.

15. A method for loading supply tape into cartridges, each cartridge being of the type containing two internal hubs connected to a tape member therebetween, said method comprising the steps of winding a single source of supply tape aligned and held in a first track of an assembly into a first cartridge positioned in a first winding assembly while simultaneously positioning a second cartridge in a second winding assembly, extracting a portion of the tape member of said second cartridge, aligning and holding said extracted tape member in a second track of said assembly and preparing said extracted tape member to be spliced to said supply tape after a desired length of supply tape is wound into said first cartridge.

16. The method of claim 15 further comprising the steps of:
  feeding said second cartridge into a rotatable cartridge jacket;
  rotating said cartridge jacket either 90° or 270° so as to controllably position said second cartridge in a positioning assembly; and
  feeding said second cartridge from said positioning assembly into a selected one of said first or second winding assembly.

17. The method of claim 15 further comprising applying a vacuum to the tape member of said second cartridge for extracting a portion of said tape member.

18. The method of claim 15 further comprising applying a vacuum to said first and second tracks of said assembly for aligning and holding said tape therein.

19. An assembly for splicing a tape member of a first cartridge to the leading end of a supply tape while simultaneously splicing the trailing end of a supply tape wound into a second cartridge to a previously extracted tape member of said second cartridge, said assembly comprising:
  support means having first and second tracks therein adapted to receive first and second tapes;
  means for positioning said first and second tapes in said first and second tracks, respectively;
  a movable block having third, fourth and fifth tracks therein, each adapted to receive tape;
  means for positioning tape in each of said third, fourth and fifth tracks;
  means for selectively aligning the first track of said support means with the third or fourth track of the movable block and, concurrently, the second track of said support means with the fourth and fifth track of the movable block; and
  splicing means for selectively joining tape positioned on said support means with tape positioned on said movable block.

20. The assembly of claim 19 further comprising an air cylinder for activating said movable block.

21. The assembly of claim 19 further comprising a vacuum means for positioning tape in the first and second tracks of said support means and the third, fourth and fifth tracks of said movable block.

22. The assembly of claim 20 wherein said splicing means is positioned above said support means so as to operate simultaneously on tape in said first and second tracks of said support means.

23. A feeding assembly for selectively feeding a cartridge into a first or second winding assembly, said feeding assembly comprising:
a hopper for holding a plurality of cartridges;
a rotatable cartridge jacket adapted to receive and hold a cartridge, said jacket having a guide means for holding and selectively releasing said cartridge therefrom; and
positioning means for receiving a cartridge from said jacket and for selectively feeding said received cartridge into a selected one of said first or second winding assembly.

24. The assembly of claim 23 wherein said guide means is comprised of a plurality of guide members positioned so as to hold a cartridge received by said rotatable cartridge jacket and to release said cartridge in a predetermined orientation.

25. The assembly of claim 23 further comprising a motor driven chain for rotating said cartridge jacket.

* * * * *